March 19, 1935.  A. WILLIAMS  1,994,975
DRILL GRINDER
Filed April 20, 1931  3 Sheets-Sheet 1
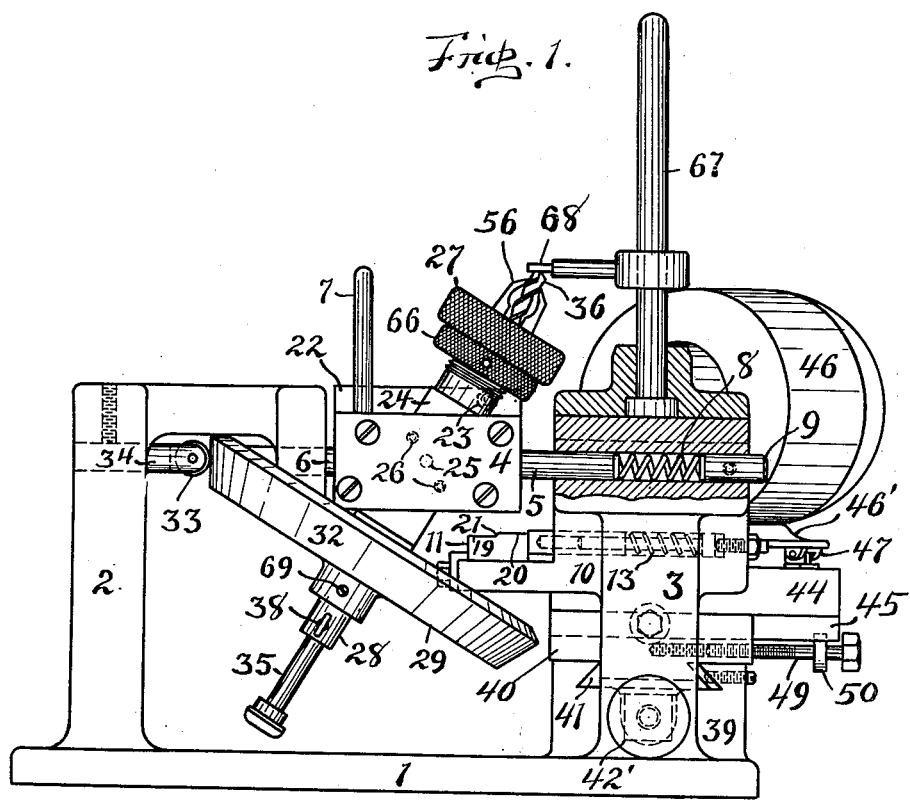
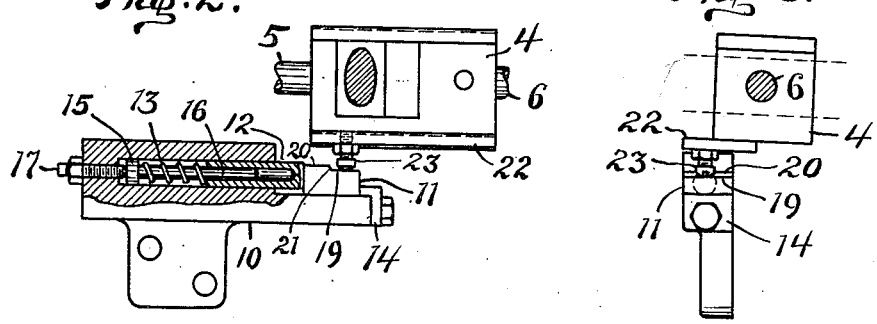
Arthur Williams
INVENTOR
BY
A. G. Burns
ATTORNEY March 19, 1935.  A. WILLIAMS  1,994,975
DRILL GRINDER
Filed April 20, 1931  3 Sheets-Sheet 2
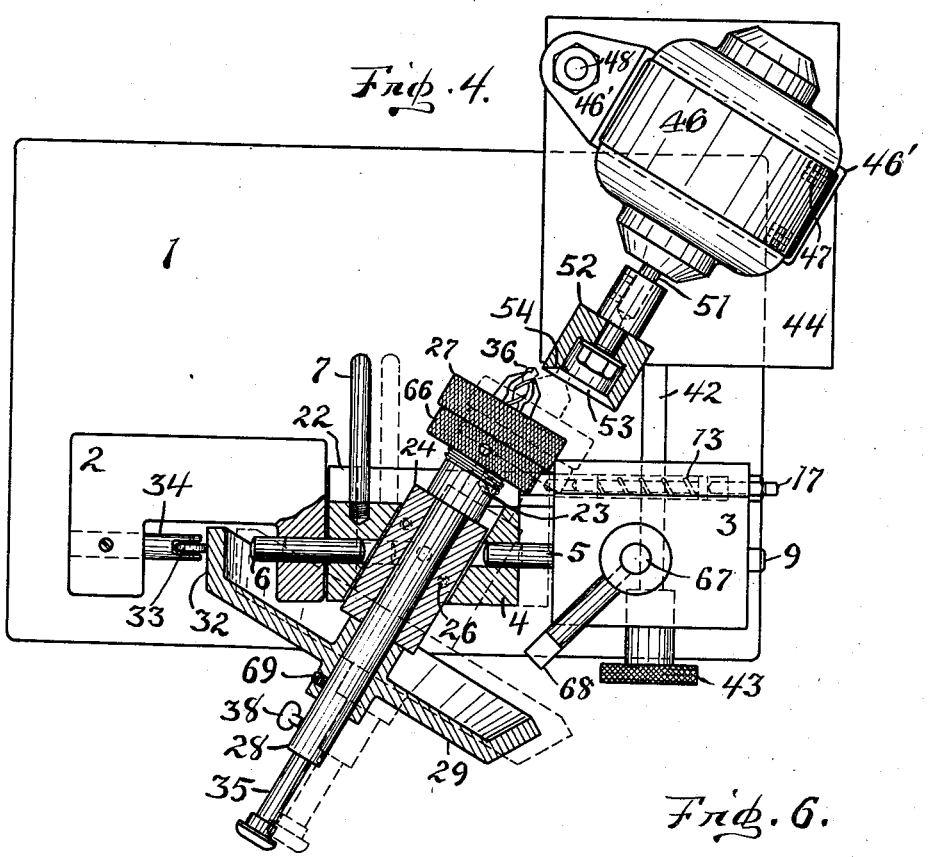
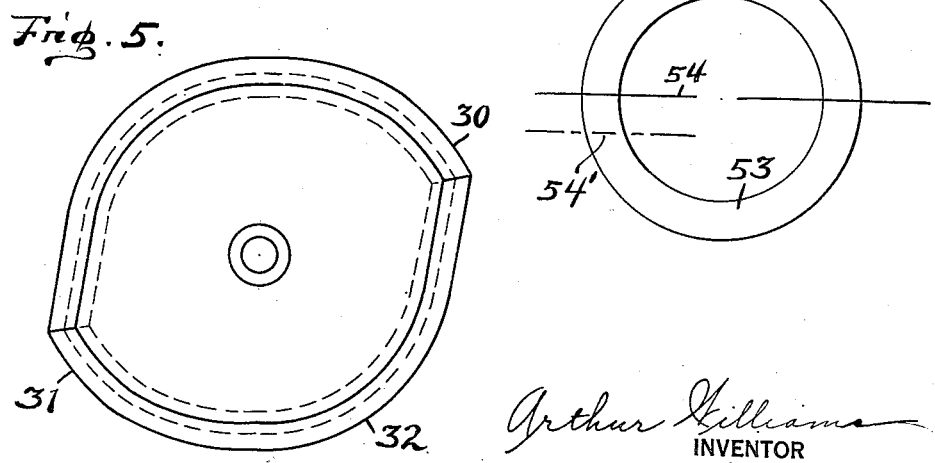

March 19, 1935.  A. WILLIAMS  1,994,975
DRILL GRINDER
Filed April 20, 1931  3 Sheets-Sheet 3
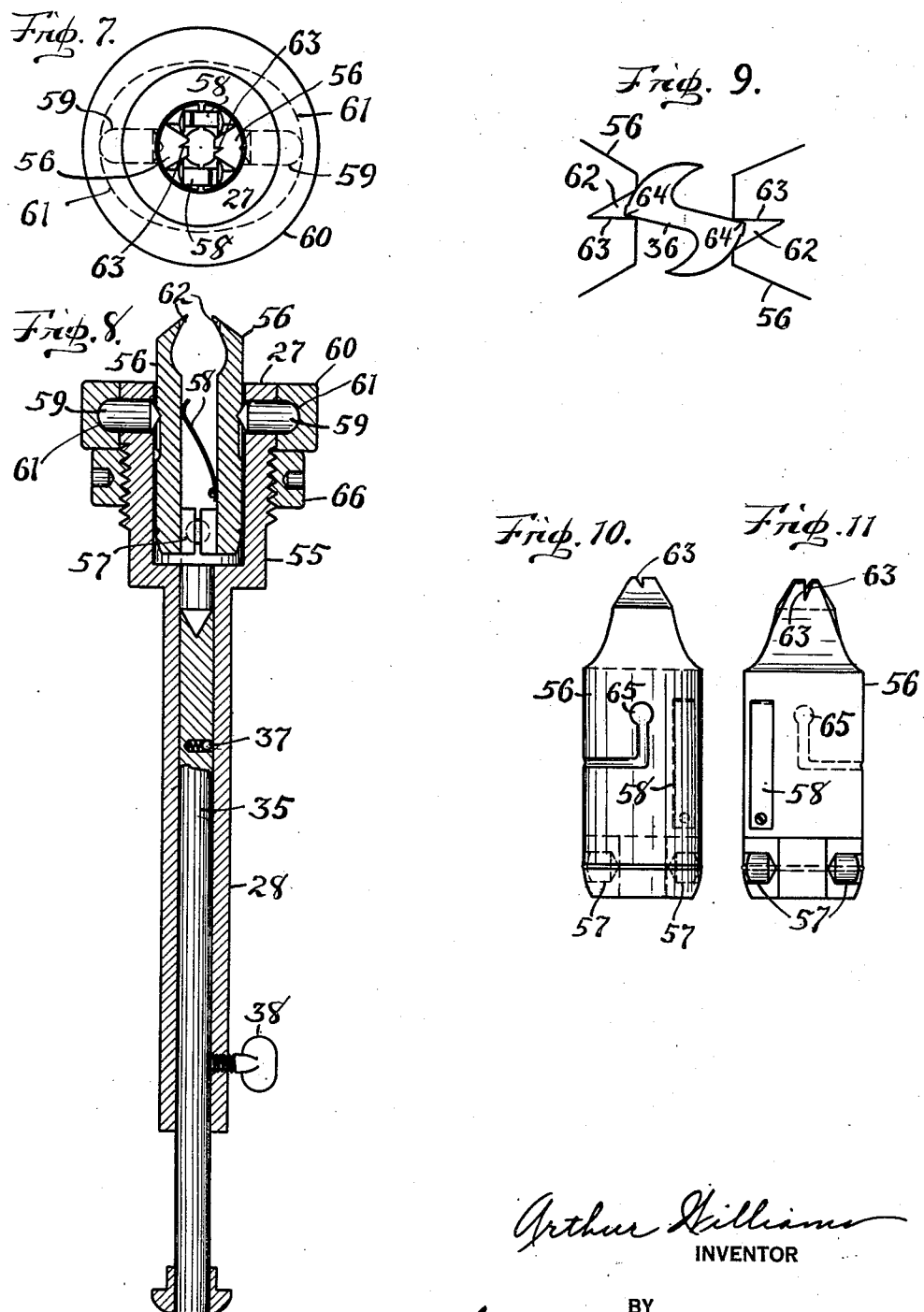

Patented Mar. 19, 1935

1,994,975

UNITED STATES PATENT OFFICE 1,994,975

DRILL GRINDER

Arthur Williams, Fort Wayne, Ind., assignor of one-third to Aloysius Lyle Poinsette and one-third to Leo J. Poinsette, both of Fort Wayne, Ind.

Application April 20, 1931, Serial No. 531,323

5 Claims. (Cl. 51—219)

This invention relates to improvements in drill grinders especially for sharpening drills particularly of that type commonly referred to as "twist drills". An object of the invention is to provide a holder for a twist drill and a mount therefor provided with mechanism whereby a drill is applied to a grindstone in such accurate manner that its cutting edges, when the dressing operation is completed, will have the same angularity with respect to the axis of the drill and extend in planes that intersect the axis of the drill at precisely the same point thereon. A further object is to provide a mechanism for grinding a drill in such manner that the clearance of the cutting end of the drill produced by the grinding operation will vary decreasingly from the center point to the circumferential limitations of the drill.

It is desirable that those portions of the cutting edges of a drill adjacent its central point require greater clearance than the outermost portions, and the present invention contemplates grinding operations such as will shape the cutting end of a drill so that a gradually increasing clearance from its circumference to its center will be established.

Other objects and advantages of the invention will appear hereinafter.

An illustrative embodiment of the invention is shown in the accompanying drawings, in which:—

Fig. 1 is a front elevation of a machine in which the invention is embodied, the drill holder being in position for setting the drill to be ground in position, a portion being broken away;

Fig. 2 is a detail view showing two of the operative parts of the machine, a portion thereof being broken away;

Fig. 3 is an end elevation projected from Fig. 2;

Fig. 4 is a plan view of the apparatus with the drill holder in grinding position, portions thereof being in section;

Fig. 5 is a front elevation of the cam wheel on the drill holder;

Fig. 6 is a diagram of the grindstone, the grinding face of which is intersected by a line indicating the contacting path of the drill upon the stone;

Fig. 7 is an end view of the drill chuck;

Fig. 8 is a vertical section of the drill chuck and its stem;

Fig. 9 is a diagram illustrating the chuck jaws in holding engagement with a drill;

Fig. 10 is an elevation showing the outer face of one of the chuck jaws; and

Fig. 11 is a view of the inner face of the chuck jaw shown in Fig. 10.

The illustrative embodiment of the invention consists of a base 1 having standards 2 and 3 projecting upwardly and spaced apart, and between its standards is mounted a block 4 having at each end a trunnion, 5 and 6 respectively, which trunnions extend horizontally from the ends of the block into the corresponding standards, said trunnions being axially alined. The trunnions support the block so that it has pivotal movement circumferentially with respect to the trunnions and longitudinal movement with respect to the axis thereof. The block is provided with a handle 7 by which the block is maneuvered. Also, in the standard 3 is disposed a spring 8 that acts against one end of the trunnion 5 which tends to hold the block in its rearmost position, there being an adjustable plug 9 in the standard 3 that bears against one end of the spring and by which the pressure of the spring against the trunnion may be varied.

A bracket 10 is secured to the rear face of the standard 3 and supports a horizontally sliding block 11 thereon, said block having a hollow stem 12 that extends into the bracket and bears against a spring 13 therein which tends to hold the sliding block in its outermost position. A stop 14 on the outer end of the bracket 10 is disposed in the path of the sliding block 11 so as to be engaged thereby and limit outward movement of the block. A plunger 15 disposed within the bracket 10 with its stem 16 extending into the hollow stem 12 and through the coil spring 13 holds the spring against the end of the stem 12, and a set-screw 17 in the bracket is provided for adjusting the plunger so that the movement of the block may be limited thereby. The top of the block 11 has two faces 19 and 20 disposed in horizontal planes spaced apart, there being a shoulder 21 extending from the one face to the other.

The block 4 has a rearwardly projecting ledge 22 from which extends downwardly a screw-stop 23 the head of which rests upon the sliding block 11 whereby downward tilting movement of the block 4 is limited. The screw-stop 23 is adjustable in the ledge 22 so that the tilting movement of the block 4 is correspondingly affected.

A bearing 24 extends diagonally through the block 4 and is secured therein upon pivots 25 upon which the bearing has slight adjustable movement, there being provided set screws 26 for holding the bearing in adjusted positions in the block.

The bearing 24 affords support for a chuck 27, the stem 28 of which extends through and is rotatable in the bearing. One end of the stem 28 that projects beyond the bearing 24 has mounted thereon a cam wheel 29 provided with two similar peripheral cam faces 30 and 31 located diametrically opposite each other. The rim 32 has bearing contact with a roller 33 that is mounted upon a stud 34, which stud is secured in the standard 2 in alinement with the trunnions 5 and 6. The cam faces 30 and 31, as the cam wheel 29 is revolved, bear against the roller 33 and cause reciprocal movement of the block 4 longitudinally with respect to its trunnions 5 and 6. Thus, upon each complete revolution of the cam wheel the block 4 receives two longitudinal movements in each direction. The forward stroke of the block is occasioned by one or the other of the cam faces 30 or 31, while the return strokes of the block are occasioned by the reaction of the spring 8, the pressure of which spring against the trunnion 5 causes the rim 32 to bear constantly against the roller 33.

The stem 28 of the chuck 27 is tubular and therein is disposed an axially adjustable stop 35 that contacts with the end of a drill 36 when inserted into the chuck and thereby limits inward axial movement of the drill into the chuck. A spring pressed ball 37 disposed in the stop bears against the inner wall of the stem 28 and tends to frictionally hold the stop in adjusted positions therein, and also a thumb-screw 38 in the stem is provided for securing the stop in adjusted positions in the stem when the screw is tightened.

Upon the base 1 spaced rearwardly thereon from the bracket 3 is a pillar 39 having thereon a sliding block 40, there being a dove-tail guide 41 on the bottom of the slide fitted into the top of the pillar whereby movement of the slide on the pillar is permitted but restricted to the direction at right angles to the axis of the trunnions 5 and 6. A feed screw 42 provided with a knob 43 is rotatably mounted in the bracket 3 and has threaded connection with a lug 42' that depends from the guide 41, whereby movement to the block 40 is imparted in the direction at right angles to the axis of the trunnions 5 and 6. Upon the block 40 is disposed a bed 44 having a dovetail guide 45 that is fitted into the block 40 whereby movement of the bed 44 upon the block 40 is permitted but restricted to the direction parallel with the axis of the trunnions 5 and 6.

Upon the top of the bed 44 is mounted a motor 46, the base 46' of the motor being provided at one side with a hinge connection 47 with the bed, the opposite side of the motor base being provided with an adjusting bolt 48 that extends into the bed 44 whereby the motor may be vertically adjusted. The bed 44 is adjusted on the block 40 by means of a screw 49 that is rotatably mounted in a pendant 50 on the bottom of the guide 45 so that the motor may be adjusted in the direction parallel with the axis of the trunnions 5 and 6 by turning of the screw 49. The position of the motor upon the bed is such that the axis of its armature shaft 51 is disposed substantially in a vertical plane parallel with that of the stem 28 of the chuck.

The armature shaft 51 has secured thereon a grindstone 52 of cylindrical form, the outer end face 53 of which tapers inwardly at such angle that the one side thereof at the horizontal plane 54 of the axis of the grindstone is substantially parallel with the axis of the trunnions 5 and 6, the actual line of contact 54' of the drill 36 across the face 53 of the grindstone being located in a horizontal plane spaced slightly below and parallel with the horizontal plane of the axis of the grindstone.

The drill chuck 27 has a hollow head 55 having positioned therein opposed jaws 56 the lower ends of which have positioned therebetween at the sides thereof fulcrum bearings 57, the upper ends of the jaws being held apart by springs 58 that are fastened at their lower ends respectively to one of the jaws and bear at their opposite ends against the inner face of the opposite jaw. In the upper portion of the head 55 are disposed diametrically opposite each other a pair of movable plungers 59, and around the upper portion of said head is positioned a rotatable collar 60 having opposite internal cam faces 61 that have engagement respectively with the outer ends of said plungers, so that when the collar is turned upon the head, axial movement is imparted to said plungers. Thus, when the collar is turned in one direction to the other the jaws are accordingly actuated through the medium of the plungers.

The jaws 56 have respectively in their upper ends notches 62 to provide faces 63 that lie opposed in a common plane and against which the fins 64 of the drill 36 respectively bear so that forward rotation of the drill in the chuck is thereby estopped.

Also, each jaw 56 has made therein an indentation 65 into which the pointed end of the corresponding plungers 59 center whereby said jaws are held from axial and rotary movement with respect to the head 55.

The head 55 is exteriorly threaded and has thereon a lock ring 66 adapted to secure the collar 60 in adjusted positions.

Upon the top of the standard 3 is a vertically disposed post 67 secured in a convenient manner to have rotary movement, and upon said post is secured at right angles to the axis thereof a finger constituting an indicator 68 which by turning the post 67 may be positioned so as to extend across the axial center of the drill 36 when the drill holder is turned upon the trunnions 5 and 6 to the position indicated in Fig. 1. The indicator is secured upon the post 67 approximately at such height thereon that when the drill is secure in the chuck with its point projecting sufficiently to contact with the indicator, the point of the drill, when the drill holder is turned to grinding position, will project sufficiently outward from the chuck to contact with the face 53 of the grindstone along the line of contact 54 as the drill holder is moved longitudinally upon the axis of its trunnions.

In operating the machine, the drill 36 to be dressed is inserted into the chuck of the drill holder and the indicator is moved over into engaging position across the axis of the chuck while the latter is in its uppermost position as shown in Fig. 1. The drill is then moved into contact with the indicator and secured in the chuck by turning the collar 30 so that the fins of the drill bear against the faces 63 of the jaws. The drill holder is then turned upon the axis of the trunnions 5 and 6 until the screw stop 23 bears upon the face 19 of the sliding block 11. The cam wheel 29 is then manually rotated whereupon the drill holder is reciprocated longitudinally upon the axis of the trunnions 5 and 6 concurrently as the chuck is rotated upon its own axis. During the reciprocation of the drill holder and the rotation of the chuck the drill is moved, while turning, across the line of contact 54' (Fig. 6) of the face 53 of the grindstone. Forward movement of the drill across the line of contact inwardly with respect to the grindstone occurs upon each half revolution of the cam wheel 29 through action of the corresponding cams 30—31 against the roller 33. In this manner the ends of the fins 64 are alternately applied to the face of the grindstone as the cam wheel is revolved. Upon each movement of the drill inwardly across the face of the grindstone, the sliding block 11 is correspondingly moved because of engagement of the stop screw 23 with the shoulder 21 on said block, movement of the block being opposed by the spring 13. Upon completion of the inward stroke of the drill holder, by manipulation thereof, the drill is slightly elevated and the stop screw thereupon is disengaged from the shoulder 21 which permits the sliding block to be moved outwardly by reaction of the spring 13, and thus the face 20 thereon is projected beneath the stop screw 23 and the tool holder is prevented from being tilted back to its grinding position whereby the drill is sustained out of contacting relation with the grindstone during the backward strokes of the drill holder.

The cam wheel 29 is provided with a set screw 69 that has engagement with the stem 28 of the chuck so that it is circumferentially adjustable thereon.

By adjusting the drill 36 axially in the chuck 27 so as to contact with the indicator 68 and adjusting the cam wheel 29 on the stem 28 the operator is enabled to secure the drill in the drill holder in such position that the ends of its fins will be alternately presented to the grindstone and be moved across the face 53 thereof along the contact line 54 as the cam-wheel is rotated. During the forward stroke of the tool holder, that is, when the drill is progressed across the grinding face of the grindstone toward the center thereof, the drill is axially turned while the screw stop 23 bears upon the face 19 of the sliding block 11, whereby the pressure of the contacting fin of the drill upon the grindstone is limited. As the cam wheel is rotated the fins alternately have contact with the grindstone, and as the end of the drill is reduced by the action of the grindstone pressure between the drill and the grindstone is dependent upon manipulation of the feed screw 42.

During the movements of the drill along the contact line, across the face of the grindstone, the drill is turned upon its axis so that the ground ends of the contacting fins of the drill are shaped by the action of the grindstone so as to have gradually receding arcuate faces extending from their cutting edges to the opposite sides thereof. In this manner is afforded adequate clearance for the cutting end of the drill as well as optimum support for the cutting edges of the fins. Also, when the grinding operation is completed the cutting edges of the fins are left disposed in planes extending precisely with like angularity with respect to the axis of the drill which augments its efficiency in operation.

I claim:

1. In a drill grinder, supporting standards, a block having alined trunnions upon which the block has pivotal and axial movement, a chuck having a stem rotatably mounted in said block, a cam-wheel secured on said stem the rim of which has diametrically opposite cam faces, a bearing acting against the rim of said cam-wheel whereby longitudinal movement is imparted to said block as said wheel is rotated, a rotating cylindrical grindstone one end of which has a tapered cutting face the contacting portion of which is parallel with the axis of said trunnions, a spring-restrained slide having two faces disposed in separated planes and a shoulder connecting same, and a stop on said block engageable with the faces on the slide selectively as said block is moved in opposite directions.

2. In a drill grinder, a tool holder supported so as to have tilting and sliding movement, a cam-wheel having a rim provided with diametrically opposite cam faces, a bearing upon which the rim of said cam-wheel has contact whereby longitudinal movement is imparted to the tool holder when said cam-wheel is rotated, a slide having two faces disposed in separate planes and a shoulder connecting same, a stop on said tool holder engageable with said faces on the slide selectively as said block is moved in opposite directions, and a rotating grindstone the cutting face thereof being so disposed that its contacting portion is parallel with the direction of the sliding movement of said tool holder.

3. In combination with a revolving grindstone, a tool holder mounted so as to have tilting and sliding movements, a sliding block having two faces disposed in separate planes, and a stop on said tool holder engageable with said faces selectively adapted to limit tilting movement thereof during its corresponding longitudinal movements.

4. In a drill grinder, a drill holder having supports upon which it has pivotal and axial movements; a cam-wheel the rim of which has opposite cam faces, a bearing contacting with said rim whereby said drill holder is reciprocated longitudinally upon rotation of said cam-wheel, means for limiting pivotal movement of said holder at different points accordingly as it is reciprocated in opposite directions, and a grindstone engageable with a drill secured in said holder when said holder is moved in one direction, said means being adapted to prevent contact of the drill with the grindstone when the holder is moved in the other direction.

5. In an appliance of the class described, a base having standards thereon, a tool holder supported in said standards so as to have pivotal and sliding movements including a chuck and a cam-wheel for rotating the chuck, a bearing having contact with the rim of said cam-wheel whereby longitudinal movement is imparted to said holder as said cam-wheel is revolved, a motor mounted upon said base so as to have horizontal and vertical adjustments, and a grindstone on the motor shaft disposed so as to have contact with a tool when supported in said holder.

ARTHUR WILLIAMS.